Patented Feb. 1, 1944

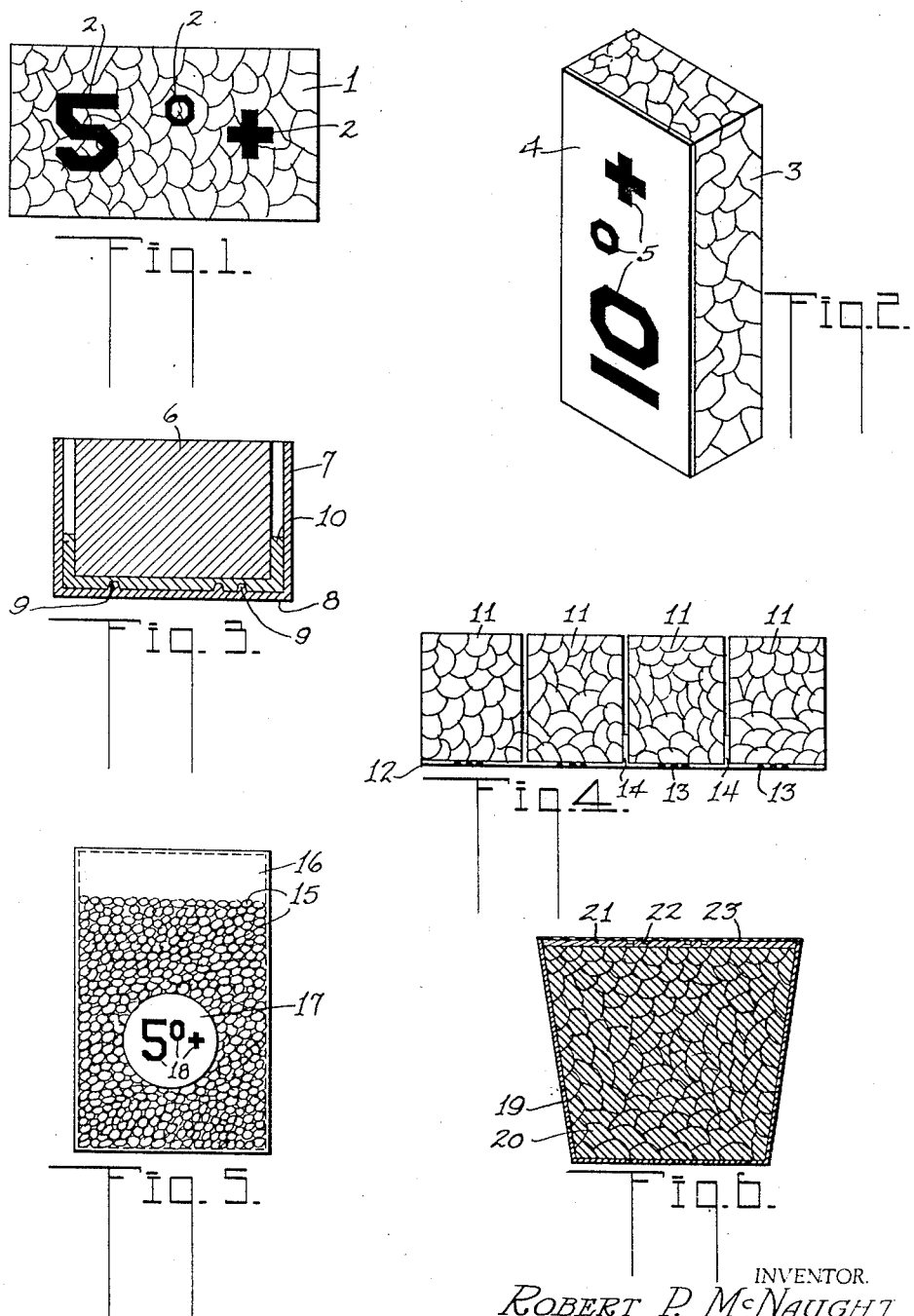

2,340,337

UNITED STATES PATENT OFFICE 2,340,337

PERISHABLE MARK FOR QUICK-FROZEN FOODS

Robert P. McNaught, San Francisco, Calif., assignor of one-third to Catherine Marie Bastian and one-third to Ada Ann McNaught, San Francisco, Calif.

Application April 25, 1939, Serial No. 269,916

3 Claims. (Cl. 99—192)

My invention relates to improvements in a perishable mark for quick frozen foods, and it consists of the combinations, constructions and arrangements hereinafter described and claimed.

The industry of quick freezing perishable products is comparatively young and there is a big difference in the quick freezing of a product as practiced today and the maintaining of a product in cold storage. In quick freezing, the product is first subjected to a temperature of as low as 50° F. below zero for the purpose of transforming the natural food to a quick frozen food that has a microscopic crystalline structure. After this is accomplished, the food can be kept in a good condition almost indefinitely providing the temperature is maintained at not more than 10° above zero. When food is kept in cold storage, the freezing is accomplished much more slowly and this will cause large crystals to be formed in the product that will puncture the food tissues. The subsequent thawing out of the product will cause the crystals to melt and leave openings where the tissues were punctured and the juices from the food product will escape through these openings. The product will therefore not have the taste of freshness because these juices are lost. In quick freezing, large crystals are not formed and therefore the food tissues will not be punctured. The juices cannot escape when the food is thawed and the food will therefore have a freshness in taste.

It is necessary that the product, after it is quick frozen, be maintained at a temperature not more than 10° above zero from the time of quick freezing up until the time the product is used by the consumer. If the product should accidentally be allowed to reach a temperature higher than 10° above zero and then subsequently the temperature is lowered to the former point, the formation of large crystals will take place puncturing the food tissues and defeating the very purpose for quick freezing the foods. Also many foods will start to deteriorate if they are permitted to reach a higher temperature than 10° above zero even though they are continually maintained at a temperature below freezing.

The principal object of my invention is to provide an improvement over my co-pending application, Serial No. 165,532, filed September 24, 1937, now Patent No. 2,216,127. In the application, I showed a mark which will melt or otherwise lose its identity when the temperature of the product on which the mark is applied exceeds the temperature indicated by the mark. A subsequent lowering of the temperature of the product will not clear up the shape of the mark and therefore a person will instantly know that the food product has been permitted to reach a temperature too high for safety and can refuse to buy the product.

In the present invention, the mark is formed from an edible material and is applied directly to the frozen product rather than to a block of ice containing the product as shown in my copending case. The mark will in no way contaminate the food product when both are thawed and this obviates the necessity of placing the mark in a separate package from the food product. A still further feature lies in the fact that the mark may be made from an edible product which will enhance the food product. For example, a mark formed from wine may be applied to a quick frozen pot roast. When the mark melts during the cooking of the roast, the wine will give a very desirable flavor to the meat. It is possible to provide the mark on a meltable wafer and insert it in a container carrying the quick frozen food. The material forming the wafer, or the mark, or both may be constructed to melt at the temperature indicated by the mark and the material of either will not contaminate the food when thawed. The wafer could be made of milk when used in connection with a quick frozen product such as peas or corn.

It is further possible to cause the material forming the mark to also act as a binder between different blocks of the food. Oysters can be quickly frozen in containers and removed from each container after freezing in the form of blocks. These blocks may then be placed in a larger container and spaced a slight distance from each other, after which a liquid may be poured into the container and will rise to a predetermined depth. This liquid will be quick frozen and will bind the blocks of oysters together. The large container can have raised characters for impressing the trade mark or melting temperature of the mark in the binding liquid that covers the bottom of each block. In the case of quick frozen oysters, the binding liquid for the blocks may be oyster juice and this will not contaminate the oysters when they are thawed.

Other objects and advantages will appear in the following specification, and the novel features of the device will be particularly pointed out in the appended claims.

My invention is illustrated in the accompanying drawing forming a part of this application, in which Figure 1 is a plan view showing a frozen mark placed directly on frozen food;

Figure 2 is an isometric view of a frozen confection consisting of fruits and juices with a frozen mark applied on a contrasting color background;

Figure 3 is a sectional view through a container and food product illustrating how the mark is impressed on the food;

Figure 4 is a side view of a number of blocks of frozen food held together by a quick frozen liquid with a mark impressed therein;

Figure 5 is a view of a transparent package containing a quick frozen product and a perishable wafer with a mark thereon; and Figure 6 is a section through a container with a quick frozen food therein and covered with a quick frozen liquid having the mark impressed therein.

In carrying out my invention, I show in Figure 1 a quick frozen food indicated generally at 1 and on this food a mark shown at 2 is placed. This mark can either be painted on the frozen food or sprayed thereon with the use of a stencil. The mark is formed from an edible product mixed with sufficient alcohol to cause it to melt at the temperature desired. For example, the mark shown in Figure 1 reads 5° +, which means 5° above zero Fahrenheit. After the product 1 is quick frozen and the mark applied thereto, any subsequent raising of the temperature of the product to a point above 5° F., the mark will melt and disappear. A subsequent lowering of the temperature will not bring the mark back into prominence and therefore a purchaser will know that the product has not been maintained continuously at a temperature of 5° above zero Fahrenheit from the time the product was quick frozen.

In Figure 2, a fruit confection is shown at 3. The confection is composed of fruit and fruit juices quick frozen and then the confection is dipped into milk so that a layer of milk shown at 4 will be quick frozen to one face of the product. The layer of milk will provide a white background for a mark shown at 5 which indicates the temperature at which the confection must be maintained to prevent it from spoiling. This mark reads 10° +, which means 10° above zero Fahrenheit. The mark may be composed of a fruit juice having a natural color mixed with a sufficient amount of alcohol to cause it to melt when a temperature above 10° F., is reached. Since the mark 5 is made of an edible material, and the background 4 is also made of an edible material, the melting of either or both will not contaminate the confection 3, but instead will add to the tastiness of the confection.

In Figure 3 I show another method of applying a mark to a quick frozen food. A pot roast shown at 6 has been quick frozen and then placed in a container 7 so as to be spaced from the side walls of the container a slight distance and also spaced a slight distance above the bottom of the container. The bottom 8 of the container has raised projections 9 which can form a character or indicate the temperature at which the quick frozen product must be maintained in order to preserve it indefinitely.

The fluid forming the mark may comprise a wine, indicated at 10, which is poured into the container 7 and will fill the bottom of the container and rise to a predetermined height along the side of the pot roast. The wine contains a quantity of alcohol and this may be diluted with fruit or berry juice having the same or harmonizing color as the wine to ause it to melt at any desired temperature below freezing. The wine when frozen, becomes a permanent part of the pot roast and the two may be removed from the container as a unit leaving the pot roast with an impression therein indicating the required temperature at which the food must be maintained. When the pot roast is thawed, the wine will also be thawed and the wine will mix with the pot roast during the cooking process and materially aid the cooked taste of the roast. The mark on the roast is in effect an edible mark which will not contaminate the food product when thawed.

In Figure 4 I show the marking of a food product such as oysters indicated at 11 and coated on one face and a part of another with an edible liquid such as oyster juice shown at 12. The oysters are first quick frozen in separate containers (not shown) to form blocks 11 and then the blocks are placed in a larger container and are spaced slightly from each other and also from the bottom of the container for permitting oyster juice to enter the spaces. The large container (not shown) has projections similar to those shown at 9 in Figure 3 and these projections will impress characters 13 in the layer 12 of oyster juice. The juice is mixed with a sufficient quantity of alcohol or other edible antifreeze solution to cause the layer 12 to melt at any predetermined temperature below zero.

The juice will also bind the adjacent blocks 11 together as shown at 14 and this will provide a package containing a number of blocks of an edible product which will permit any desired number of the blocks to be removed from the others at will. It will be noted that the portion of the juice linking two adjacent blocks together does not extend throughout the entire space between blocks and therefore the blocks may be readily severed one from the other. The oyster juice when melted will not contaminate the oysters, but instead will provide the necessary fluid in which the oysters may be cooked.

In Figure 5 a kernel type of food is illustrated, such as peas, corn, etc. The kernels 15 are placed in a transparent container 16 and may be quick frozen before or after being placed in the container. A frozen disc or wafer 17 is placed in the container and this disc carries a mark 18 that indicates the temperature below freezing at which the goods must be maintained in order to preserve them. The disc may be made of milk or other edible products which will melt and the mark may comprise an edible fluid mixed with a sufficient quantity of alcohol or other low-freezing solution to cause the mark to melt at the desired temperature. It is possible to combine the milk forming the wafer with a low-freezing solution and thus the wafer will melt when the temperature exceeds a predetermined point below freezing. Either the milk or wafer or both may have a low-freezing solution combined therewith. The melting of the wafer and the mark will not contaminate the quick frozen product 15 and if milk is used for the wafer this milk can be used in cooking the food product such as peas or corn. The edible product forming the wafer 17 may be poured into a shallow dish and frozen after which the mark may be applied. The disc is then dropped into the container with the food product 15.

In Figure 6 a container 19 is shown filled with a quick frozen food product 20. The top of the container is open and the product is sealed by a fluid that forms into a layer 21. This fluid will melt at a predetermined temperature below freezing and has characters 22 impressed therein to designate the temperature at which the food must be maintained.

The layer 21 is composed of an edible material that will materially combine with the product 20, when the two are thawed. If desired, a Cellophane cover 23 may be placed over the layer 26.

In all of the products shown in the various figures, no water forming blocks of ice is necessary. The products themselves are quick frozen and the mark directly applied thereto.

The liquid used in marking the food should melt at a few degrees above the temperature at which it is desired to maintain the quick frozen product. The temperature at which the mark will melt will vary with the products to be marked and also with the wishes of the producer as to what degree he wishes to maintain his product in order to retain his mark. It is therefore possible to apply two marks to the product, one indicating the temperature at which the product must be maintained below freezing and the other constituting a trade-mark and indicating the origin of the goods. I do not wish to limit myself to two marks because some producers may wish their products marked with several indicators, each one indicating a distinct temperature rise.

The most important feature of my mark is the fact that it consists of a liquid food and therefore will not contaminate the food product to which it may be directly applied rather than be kept in a separate container from the food. The mark itself is an integral part of the food product. The food may then be wrapped in a moisture-proof transparent material such as Cellophane. Where wine is used to provide a "skin" of the desired thickness, color, and freezing point over all or a part of the food product, the mark itself may melt at the freezing point of water because in this case the mark will disappear when the melting point of the wine is reached.

Foods such as kernel vegetables, fruit salads, fruit juices, etc., may be quick frozen in containers having an open top as shown in Figure 6. The mark can be applied at the open end of the container and then covered with Cellophane.

While I have shown only the preferred form of my invention, it should be understood that various changes or modifications may be made within the scope of the appended claims without departing from the spirit of the invention.

I claim:

1. A comestible comprising a food product in plural form, each unit in the form being in a rigid state due to freezing, and an initially liquid but ultimately frozen substance interconnecting the units and covering at least a portion of one side of each unit for binding the units in interconnected mass formation but responding to breaking at connected places between units, said substance forming one of the principal or flavoring ingredients for the edible product when thawed and consisting of an edible anti-freeze solution meltable at a temperature near zero Fahrenheit, thus constituting a tell-tale mark, the substance having marked or impressed thereon when in a frozen state at each one of the units a symbol which will lose its identity when the temperature exceeds a predetermined point.

2. A comestible comprising a food product in a rigid state due to freezing, an initially liquid substance frozen in disc form like a tablet and associated with the product, said substance forming one of the principal or flavoring ingredients for the product when melted and combined therewith, the substance consisting of an edible anti-freeze solution meltable at a temperature near zero Fahrenheit.

3. A comestible comprising a food product in a rigid state due to freezing, an initially liquid substance frozen in disc form like a tablet and associated with the product, said substance forming one of the principal or flavoring ingredients for the product when melted and combined therewith and having a symbol marked or impressed thereon when in a frozen state, the substance consisting of an edible anti-freeze solution meltable at a temperature near zero Fahrenheit, and a transparent container enclosing the food product and tablet.

ROBERT P. McNAUGHT.